United States Patent [19]

Yoshimura

[11] Patent Number: 5,134,612

[45] Date of Patent: Jul. 28, 1992

[54] DIGITAL COMMUNICATION TERMINAL EQUIPMENT

[75] Inventor: Junichi Yoshimura, Hino, Japan

[73] Assignee: Fujitsu Limited, Kawasaki, Japan

[21] Appl. No.: 459,849

[22] Filed: Jan. 2, 1990

[30] Foreign Application Priority Data

Jan. 10, 1989 [JP]  Japan ................................. 1-3063

[51] Int. Cl.$^5$ .............................................. H04J 3/22
[52] U.S. Cl. ...................................... 370/84; 370/112; 371/60
[58] Field of Search ...................... 370/13, 17, 84, 112; 375/108; 371/60; 331/DIG. 2

[56] References Cited

U.S. PATENT DOCUMENTS 4,993,013  2/1991  Shinada et al. ...................... 370/84.0

FOREIGN PATENT DOCUMENTS 54-49012  4/1979  Japan .
56-122241  9/1981  Japan .
59-190736  10/1984  Japan .
59-205832  11/1984  Japan .

Primary Examiner—Benedict V. Safourek
Assistant Examiner—Ghebretinsae Temesphen
Attorney, Agent, or Firm—Nikaido, Marmelstein, Murray & Oram

[57] ABSTRACT

A digital communication terminal equipment is coupled between one or a plurality of low-speed group transmission paths and one or a plurality of high-speed group transmission paths. The digital communication terminal equipment comprises a reference part and a supervised part coupled between selected low-speed group transmission paths and high-speed group transmission paths depending on states of first and second switches, and a bit comparison supervision part for detecting a bit error in a transmission signal which is transmitted between the low-speed group transmission path and the high-speed group transmission path. The reference part has a demultiplexer circuit which demultiplexes a high-speed group signal which is received from the high-speed group transmission path via the second switch into a low-speed group signal, a memory for storing the low-speed group signal from the demultiplexer circuit in response to a write clock signal which is multiplexed within the high-speed group signal, a phase locked loop circuit which includes a voltage controlled oscillator and controls a read out from the memory in response to a read clock signal which is derived by smoothing the write clock signal, and a state detector for detecting an unstable change in an input voltage of the voltage controlled oscillator and for outputting a control signal. The control signal has a level for disabling an operation of the bit comparison supervision part when the state detector detects the unstable change in the input voltage of the voltage controlled oscillator.

9 Claims, 6 Drawing Sheets

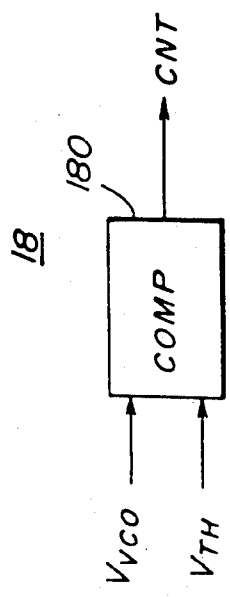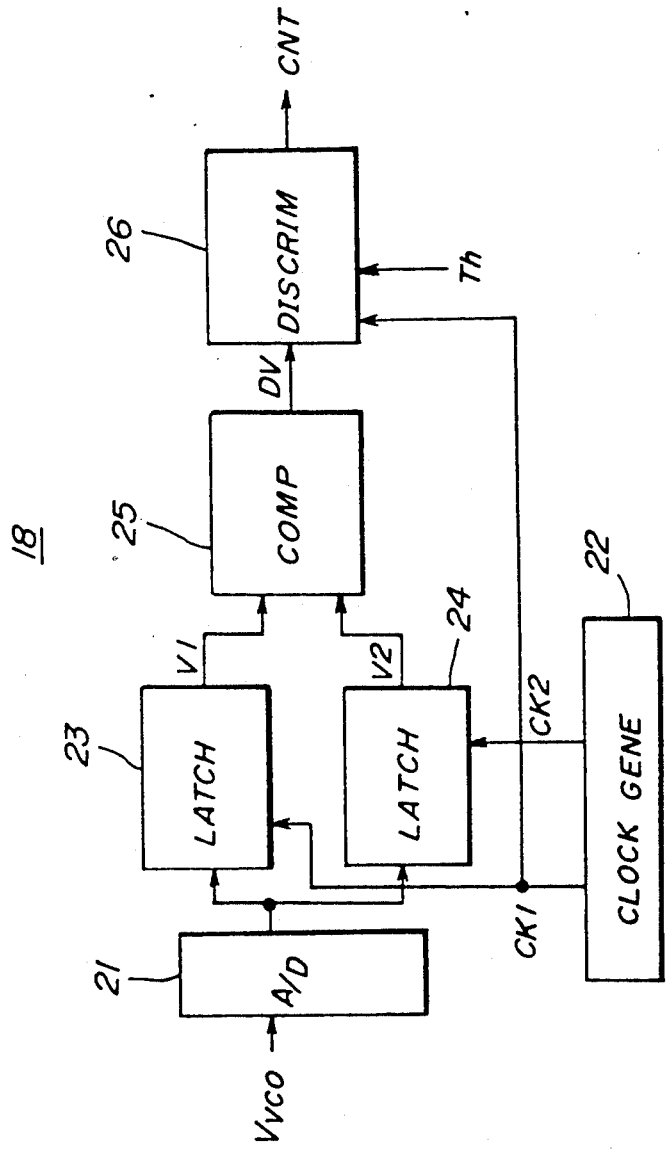

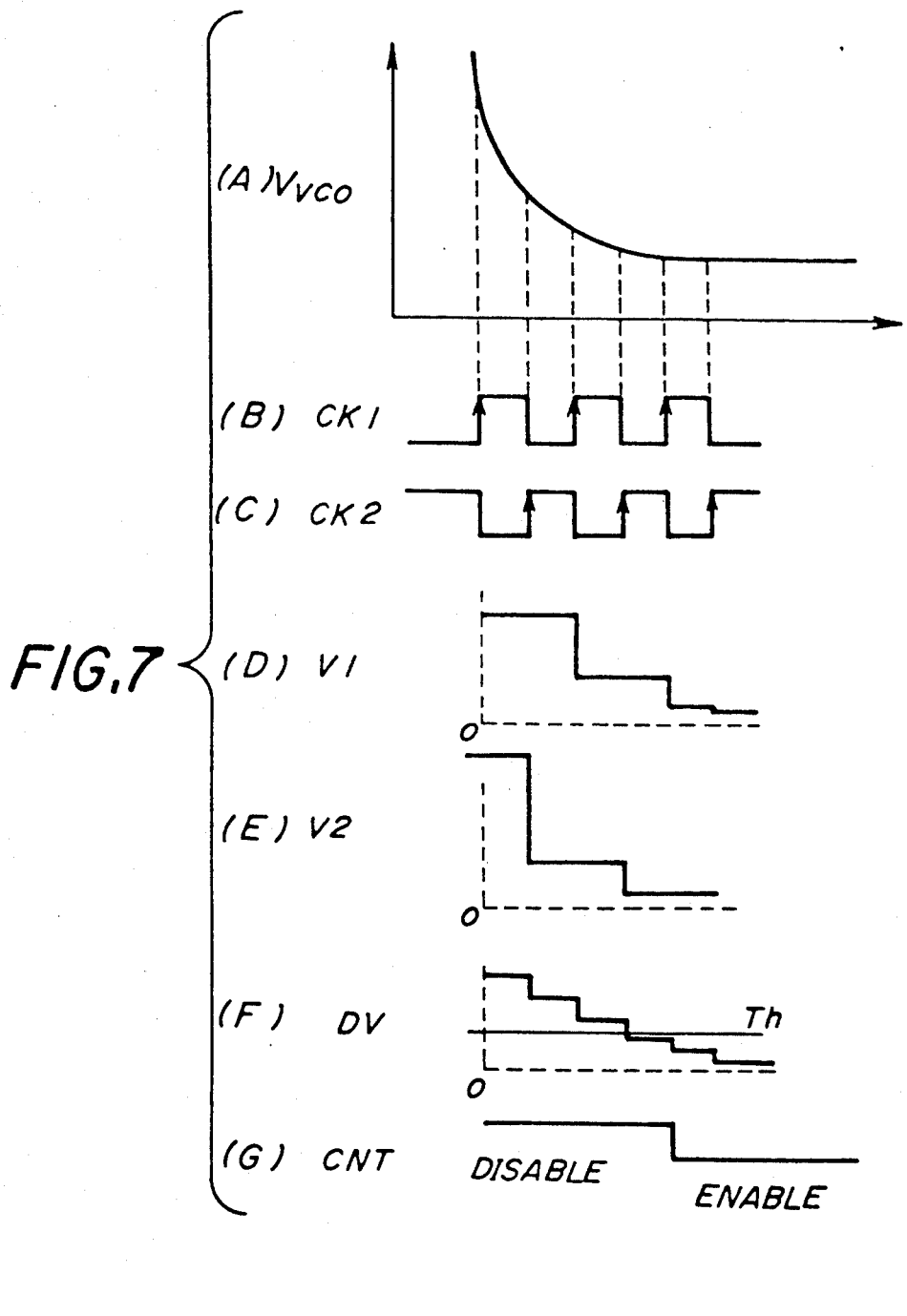

DIGITAL COMMUNICATION TERMINAL EQUIPMENT

BACKGROUND OF THE INVENTION

The present invention generally relates to digital communication terminal equipment, and more particularly to a digital communication terminal equipment which has a bit comparison management system.

A bit comparison management system detects a bit error in a transmission signal caused by a device failure in a digital communication terminal equipment. The device failure may be generated by an operation failure, a circuit failure, a damage to parts or the like.

A description will be given of a conventional bit error detection method, by referring to FIG. 1. For example, a signal from a low-speed group transmission path I is transmitted to a high-speed group transmission path II via a multiplexer or a demultiplexer of a supervised part 10. A reference part 20 converts a high-speed group output signal of the supervised part 10 to a low-speed group signal. A bit comparison supervision part 30 comprises a phase synchronizing part 31, a bit error detecting part 32 and a control part 33.

The phase synchronizing part 31 synchronizes the phase of data patterns of the low-speed group signal which is received from the low-speed group transmission path I and the low-speed group signal which is output from the reference part 20. The bit error detecting part 32 compares corresponding bits of the two synchronized data patterns received from the phase synchronizing part 31 for each bit of the data pattern. When an error is generated in the transmission signal due to a device failure, the corresponding bits of the two data patterns do not match in the bit error detecting part 32 and one bit error is detected for every corresponding bit which does not match. The control part 33 detects a bit comparison error when the number of bit errors detected in the bit error detecting part 32 exceeds a predetermined value within a predetermined time. An alarm signal is output from the control part 33 as a supervision result when the bit comparison error is detected, and this alarm signal is used to switch a connection of the supervised part 10 and the like.

When the device failure occurs, a line switching is made between current-auxiliary systems for the circuit parts and the lines of the digital transmission terminal equipment. This line switching is made based on the above described supervision result which is output from the bit comparison supervision part 30, and for this reason, a high reliability is required of the supervision result.

FIG. 2 shows a conventional digital transmission terminal equipment which is provided with current-auxiliary systems. The digital transmission terminal equipment is provided between low-speed group transmission paths I and IV and high-speed group transmission paths II and III. One of the low-speed group transmission paths I and IV is selected by a switch 6, and one of the high-speed group transmission paths II and III is selected by a switch 7. A low-speed group signal A from the low-speed group transmission path I is supplied to a current multiplexer 1 via the switch 6, and a high-speed group signal B output from the current multiplexer 1 is supplied to the high-speed group transmission path II via the switch 7. The switches 6 and 7 are also used to select one of the current multiplexer 1 and an auxiliary multiplexer 3, and in this case, the switching of the multiplexers 1 and 3 is controlled by a switching control signal SCS which is output from a control part 53 of a bit comparison supervision circuit 5. For example, the low-speed group transmission paths I and IV may respectively have n channels.

The bit comparison supervision circuit 5 includes a phase synchronizing part 51, a bit error detector part 52, the control part 53, a test pattern generator part 54, and a selector part 55.

A current demultiplexer 2 and an auxiliary demultiplexer 4 are provided between the high-speed group transmission path III and the low-speed group transmission path IV via the switches 6 and 7. The demultiplexers 2 and 4 are used to convert the high-speed group signal B into the low-speed group signal A.

The multiplexers 1 and 3 and the demultiplexers 2 and 4 constitute a supervised part, and the auxiliary demultiplexer 4 functions as a reference part for the supervised part. For example, the low-speed group signal A which is supplied to the current multiplexer 1 is supplied to the phase synchronizing part 51 via the selector part 55 as an original signal. In addition, the low-speed group signal A is subjected to a multiplexing in the current multiplexer 1 which outputs the high-speed group signal B. This high-speed group signal B is supplied to the high-speed group transmission path II and the demultiplexer 4 which functions as the reference part. The high-speed group signal B is demultiplexed in the demultiplexer 4 and is converted into a low-speed group signal C which is supplied to the phase synchronizing part 51 via the selector part 55.

The high-speed group signal B which is supplied to the current demultiplexer 2 is demultiplexed into the low-speed group signal A which is supplied to the phase synchronizing part 51 via the selector part 55. On the other hand, the high-speed group signal B is also supplied to the auxiliary demultiplexer 4 and is demultiplexed into the low-speed group signal C which is supplied to the phase synchronizing part 51 via the selector part 55.

The selector part 55 is controlled by a signal from the control part 53 and selectively supplies two signals to the phase synchronizing part 51. The two signals are the input signal of the current multiplexer 1 and the output signal of the auxiliary demultiplexer 4, the output signal of the current demultiplexer 2 and the output signal of the auxiliary demultiplexer 4, the input signal of the auxiliary multiplexer 3 and the signal from the test pattern generator part 54, or the output signal of the auxiliary demultiplexer 4 and the signal from the test pattern generator part 54.

Thereafter, the digital transmission terminal equipment operates as described above in conjunction with FIG. 1. The bit error detector part 52 detects the bit error based on the synchronized outputs of the phase synchronizing part 51 and outputs a detection signal. The control part 53 outputs an alarm signal based on the detection signal from the bit error detector part 52. The switches 6 and 7 are controlled responsive to the alarm signal which is output from the control part 53 of the bit comparison supervision part 5.

As shown in FIG. 3, a demultiplexer circuit 11 of the auxiliary demultiplexer 4 demultiplexes the high-speed group signal B into a low-speed group data DATA and a write clock signal WCLK. The write clock signal WCLK is multiplexed within the high-speed group signal B. In order to smoothen the output of the demultiplexer circuit 11 into the frequency of the original low-speed group signal A, the low-speed group data DATA is written into an elastic memory 12 in response to the write clock signal WCLK. A phase comparator 13 compares the phases of the write clock signal WCLK and a read clock signal RCLK which is generated by a phase locked loop (PLL) circuit 16. The PLL circuit 16 includes, in addition to the phase comparator 13, a lowpass filter 14 and a voltage controlled oscillator (VCO) 15 which feed back an output of the phase comparator 13 to the phase comparator 13. Although the illustration is omitted in FIG. 3, the circuit part including the elastic memory 12 and the PLL circuit 16 is provided for each low-speed group data DATA output from the demultiplexer circuit 11.

When making the bit comparison supervision of the stuff multiplexer having a redundancy system in the conventional digital transmission terminal equipment, there generally is a demand to reduce a time it takes for a main transmission circuit to be switched by the switches 6 and 7 to back up the line from a time when the device failure is detected. For this reason, a signal identical to the low-speed group signal A is generated by the test pattern generator part 54 of the bit comparison supervision part 5 and is supplied to the auxiliary multiplexer part 3. Hence, an automatic local scanning is periodically made by supplying the low-speed group signal C and the low-speed group signal A to the phase synchronizing part 51 via the auxiliary demultiplexer 4 which is used as the reference part and the selector part 55. As a result, the frequency with which the failure is detected in the auxiliary system (multiplexer and demultiplexer) and the current system (multiplexer and demultiplexer) is improved.

In the auxiliary demultiplexer 4 which is automatically testing the bit comparison supervision, the switching of the high-speed group signal takes place between a time when the local scan of the auxiliary and current multiplexer and demultiplexers and a time when a next local scan of the auxiliary and current multiplexer and demultiplexers starts. At an instant when the switching of the high-speed group signal takes place, the phase comparator 13 within the PLL circuit 16 of the auxiliary demultiplexer 4 receives no write clock signal WCLK, and as a result, the PLL circuit 16 enters a free-running state from a locked state.

After the PLL circuit 16 enters the free-running state, the PLL circuit 16 stabilizes at the frequency of the original low-speed group signal with a predetermined time constant which is peculiar to the PLL circuit 16. During the time in which the PLL circuit 16 stabilizes, there is a need to prohibit the bit comparison so as to prevent an erroneous detection of a bit error. Conventionally, a prohibiting time is timed by a kind of a timer within the control part 53 of the bit comparison supervision part 5, and the bit comparison is prohibited during the prohibiting time which corresponds to the time it takes for the PLL circuit 16 to stabilize.

According to the conventional method, the prohibiting time must be set independently for each PLL circuit 16 to match the time constant of each individual PLL circuit 16. In actual practice, however, it is virtually impossible to perfectly match the prohibiting time to the time constant of each PLL circuit 16. For this reason, the prohibiting time must be set with an added margin to ensure no erroneous detection of the bit error even for an estimated maximum time constant of the PLL circuit 16 used. As a result, the operation of detecting the bit error must be interrupted during the prohibiting time which is set in accordance with the estimated maximum time constant of the PLL circuit 16, and the bit error detection efficiency is poor. If the bit error detection frequency were increased by not adding the margin to the prohibiting time, an erroneous bit error detection would be made when the set prohibiting time is smaller than the time constant of the PLL circuit 16 used.

On the other hand, the high-speed group signal which is supplied to the demultiplexer circuit 11 of the auxiliary demultiplexer 4 is sequentially switched among the output of the current multiplexer 1, the input of the current demultiplexer 2 and the output of the auxiliary multiplexer 3. However, the three signals, that is, the output of the current multiplexer 1, the input of the current demultiplexer 2 and the output of the auxiliary multiplexer 3 are not synchronized to each other. As a result, the PLL circuit 16 enters the free-running state from the locked state every time the high-speed group signal supplied to the demultiplexer circuit 11 of the auxiliary demultiplexer 4 is switched. As described above, the prohibiting time must be set independently for each PLL circuit 16 to match the time constant of each individual PLL circuit 16, however, it is virtually impossible to perfectly match the prohibiting time to the time constant of each PLL circuit 16. For this reason, the prohibiting time must be set with the added margin to ensure no erroneous detection of the bit error even for the estimated maximum time constant of the PLL circuit 16 used.

Therefore, the conventional digital communication terminal equipment suffers from a problem in that it is impossible to simultaneously prevent the erroneous bit error detection while minimizing the prohibiting time to improve the bit error detection frequency.

SUMMARY OF THE INVENTION

Accordingly, it is a general object of the present invention to provide a novel and useful digital communication terminal equipment in which the problems described above are eliminated.

Another and more specific object of the present invention is to provide a digital communication terminal equipment which is coupled between one or a plurality of low-speed group transmission paths and one or a plurality of high-speed group transmission paths, comprising first switch device coupled to the one or plurality of low-speed group transmission paths, second switch device coupled to the one or plurality of high-speed group transmission paths, a reference part coupled between the first and second switch device and coupled between a selected one of the low-speed group transmission paths and a selected one of the high-speed group transmission paths depending on states of the first and second switch device, a supervised part coupled between the first and second switch device and coupled between a selected one of the low-speed group transmission paths and a selected one of the high-speed group transmission paths depending on the states of the first and second switch device, and bit comparison supervision device for detecting a bit error in a transmission signal which is transmitted between the low-speed group transmission path and the high-speed group transmission path by comparing corresponding bits of a low-speed group signal which is obtained from the reference part and a low-speed group signal which is obtained from the monitored part and for controlling the states of the first and second switch devices depending on the detected bit error. The reference part has a demultiplexer circuit which demultiplexes a high-speed group signal which is received from the high-speed group transmission path via the second switch device into a low-speed group signal, a memory for storing the low-speed group signal from the demultiplexer circuit in response to a write clock signal which is multiplexed within the high-speed group signal, a phase locked loop circuit which includes a voltage controlled oscillator and controls a read out from the memory in response to a read clock signal which is derived by smoothing the write clock signal, and a state detector for detecting an unstable change in an input voltage of the voltage controlled oscillator and for outputting a control signal. The control signal has a level for disabling an operation of the bit comparison supervision device when the state detector detects the unstable change in the input voltage of the voltage controlled oscillator.

According to the digital communication terminal equipment of the present invention, there is no need to set the prohibiting time for prohibiting the bit error detection independently for each individual phase locked loop circuit which is used. An optimum prohibiting time is automatically set for each individual phase locked loop circuit, and the set prohibiting time is a minimum time thereby improving the bit error detection frequency compared to that of the conventional digital communication terminal equipment. Therefore, the switching of the current-auxiliary systems can be made accurately.

Other objects and further features of the present invention will be apparent from the following detailed description when read in conjunction with the accompanying drawings.

BRIEF DESCRIPTION OF THE DRAWINGS

FIG. 5 is a system block diagram showing an embodiment of a state detector of an auxiliary demultiplexer shown in FIG. 4;

FIG. 6 is a system block diagram showing another embodiment of the state detector of the auxiliary demultiplexer shown in FIG. 4; and FIGS. 7(A) through 7(G) are time charts for explaining an operation of the state detector.

DESCRIPTION OF THE PREFERRED EMBODIMENTS

Figure 1:
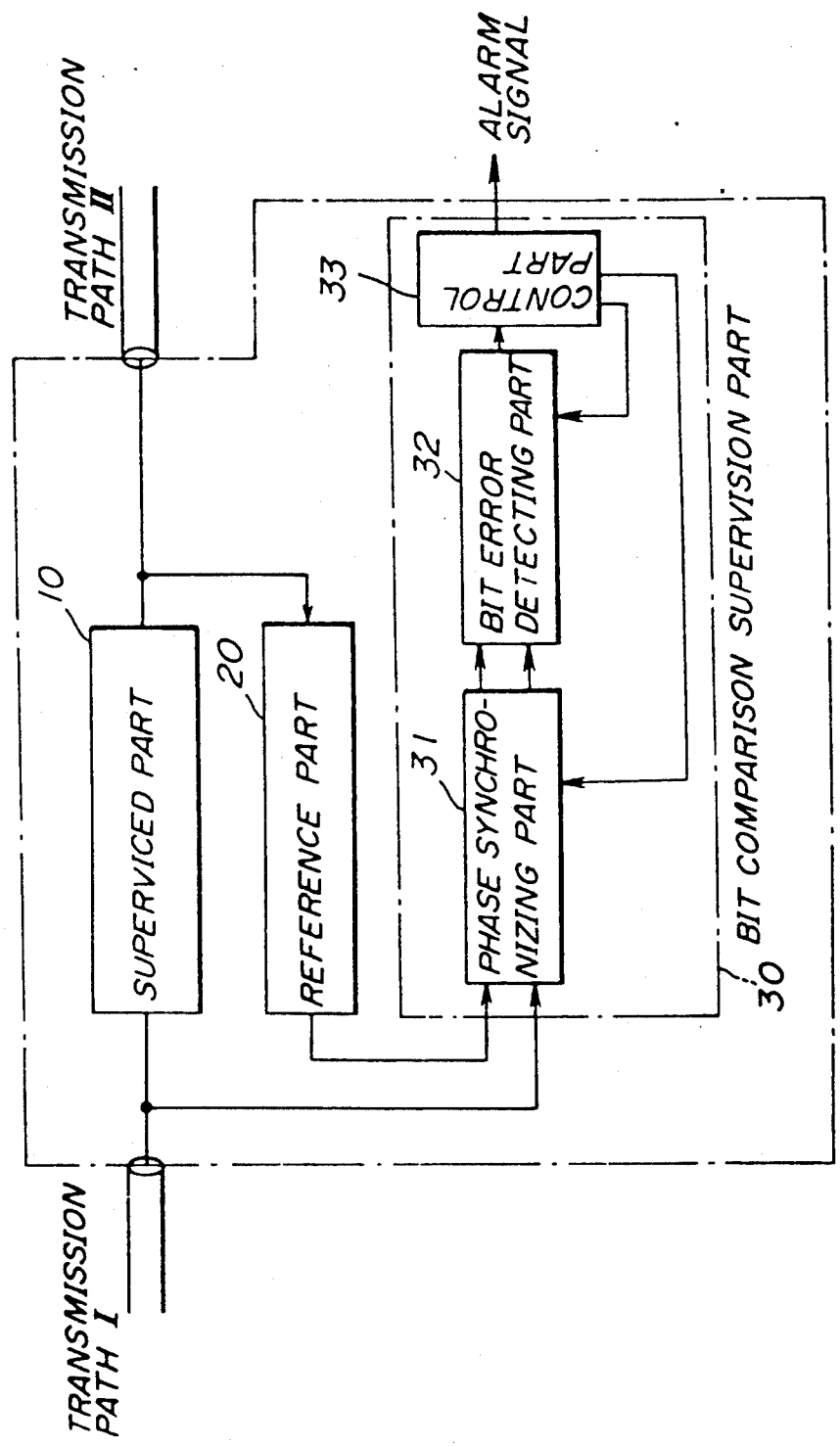
FIG. 1 is a system block diagram showing a generation structure of a conventional digital communication terminal equipment.
Figure 2:
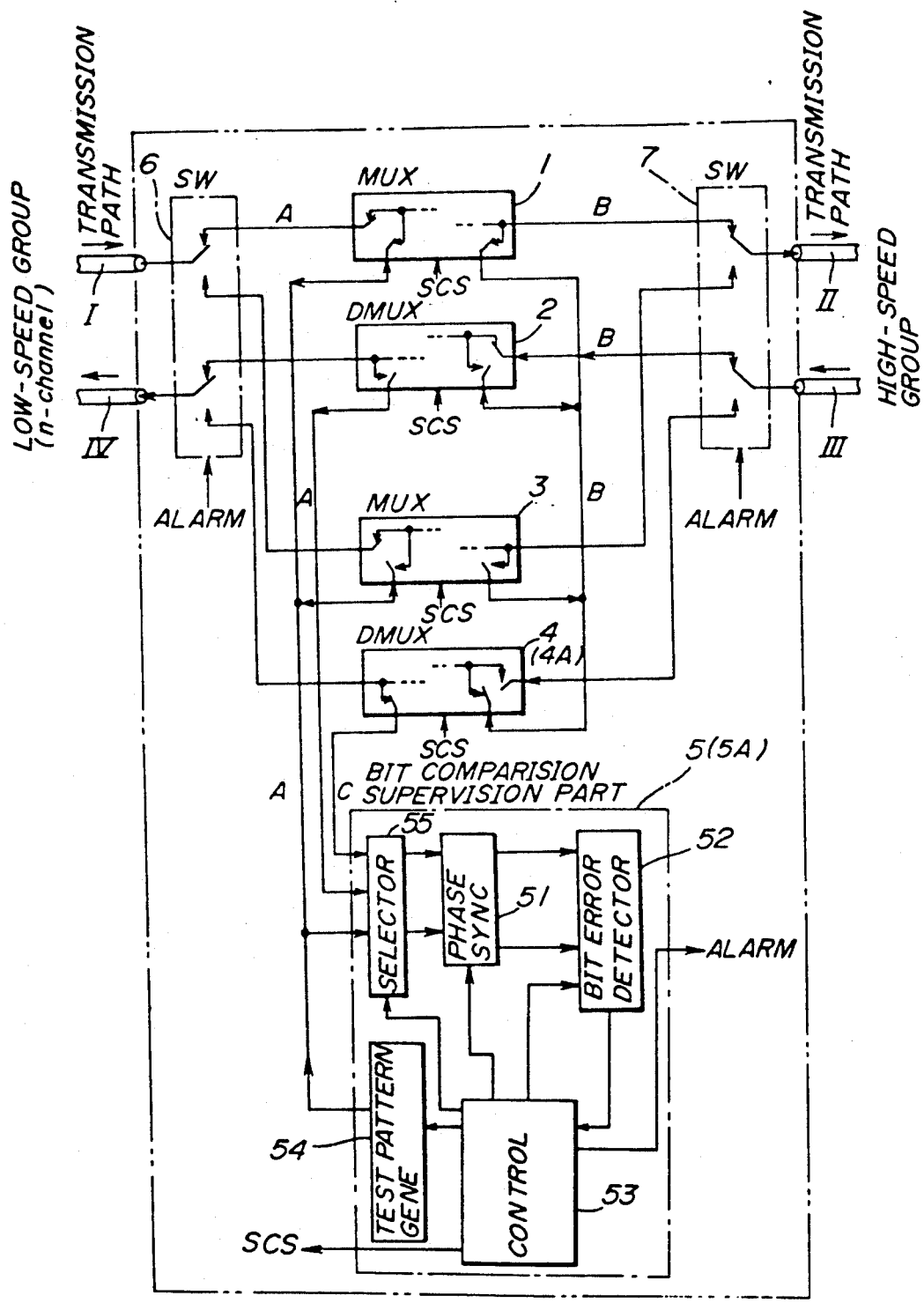
FIG. 2 is a system block diagram showing the conventional digital communication terminal equipment which has current auxiliary systems.
Figure 3:
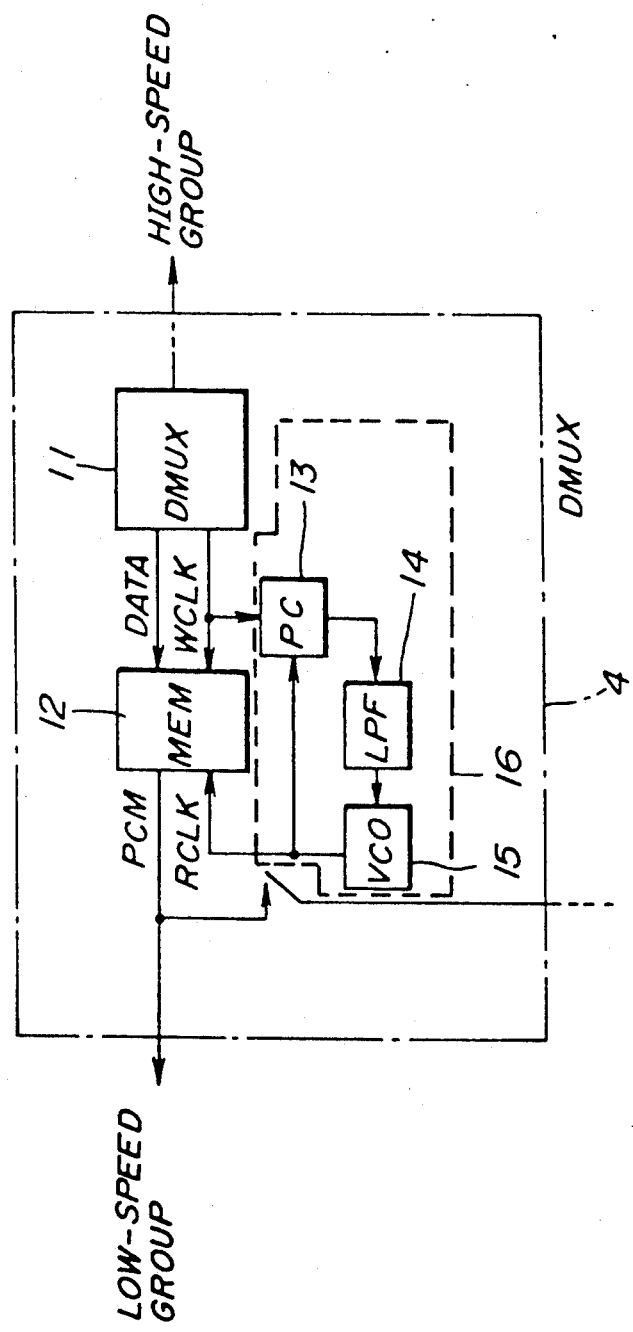
FIG. 3 is a system block diagram showing an auxiliary demultiplexer of the conventional digital communication terminal equipment shown in FIG. 2.
Figure 4:
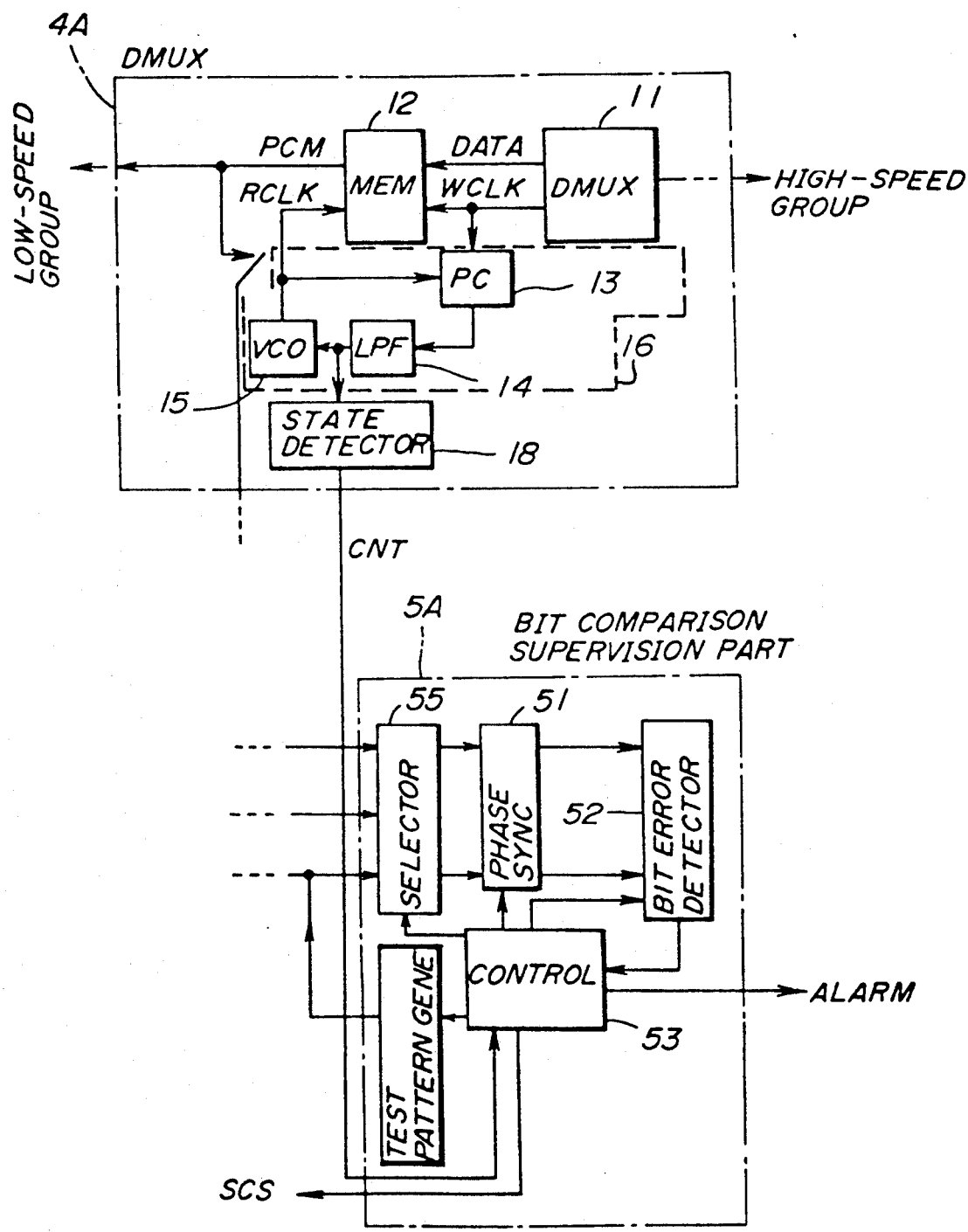
FIG. 4 is a system block diagram showing an essential part of an embodiment of a digital communication terminal equipment according to the present invention.

FIG. 4 shows an essential part of an embodiment of a digital communication terminal equipment according to the present invention. In FIG. 4, those parts which are essentially the same as those corresponding parts in FIGS. 2 and 3 are designated by the same reference numerals, and a description thereof will be omitted.

In FIG. 4, an auxiliary demultiplexer 4A which functions as the reference part additionally has a state detector 18. The state detector 18 detects an unstable (or irregular) change in the input voltage of the VCO 15, and outputs a control signal CNT for disabling the operation of a bit comparison supervision part 5A when the unstable change is detected.

The structure of the auxiliary demultiplexer 4A is basically the same as that of the auxiliary demultiplexer 4 shown in FIG. 3 except for the provision of the state detector 18. In addition, the structure of the bit comparison supervision part 5A is basically the same as that of the bit comparison supervision part 5 shown in FIG. 2 except that a control part 53A receives the control signal CNT from the state detector 18. The remaining parts of the digital communication terminal equipment shown in FIG. 4 are basically the same as that of the digital communication terminal equipment shown in FIG. 2, and the illustration and description thereof will be omitted.

In this embodiment, the state detector 18 constantly supervises the input voltage of the VCO 15 which constitutes a part of the PLL circuit 16. The output control signal CNT of the state detector 18 enables the operation of the bit comparison supervision part 5A when the input voltage of the VCO 15 is stable. However, when the high-speed group signal supplied to the demultiplexer circuit 11 of the auxiliary demultiplexer 4 is switched by the local scanning, the input voltage $V_{VCO}$ of the VCO 15 rapidly changes as shown in FIG. 7(A). This unstable change in the input voltage $V_{VCO}$ is detected by the state detector 18, and the output control signal CNT of the state detector 18 disables the operation of the bit comparison supervision part 5A.

Accordingly, there is no need to set the prohibiting time in correspondence with the time constant of each individual PLL circuit 16. Because the operation of the bit comparison supervision part 5A is disabled while the input voltage $V_{VCO}$ undergoes the unstable change, the prohibiting time in which the bit comparison supervision part 5A is disabled perfectly matches the time constant of the PLL circuit 16. As a result, the bit error detection frequency is improved since the operation of the bit comparison supervision part 5A is only disabled for the time it takes for the PLL circuit 16 to actually stabilize, without having to unnecessarily disable the bit comparison supervision part 5A for the estimated maximum time constant of the PLL circuit 16.

FIG. 5 shows an embodiment of the state detector 18. In FIG. 5, the state detector 18 comprises a comparator 180 which receives the input voltage $V_{VCO}$ of the VCO 15 and a threshold voltage $V_{TH}$. The comparator 180 outputs a high-level signal when the input voltage $V_{VCO}$ is greater than the threshold voltage $V_{TH}$, and outputs a low-level signal when the input voltage $V_{VCO}$ is less than or equal to the threshold voltage $V_{TH}$. The output signal of the comparator 180 is supplied to the bit comparison supervision part 5A as the control signal CNT. In this embodiment, the bit comparison supervision part 5A is disabled during the high-level period of the control signal CNT and is enabled during the low-level period of the control signal CNT.

In the embodiment of the state detector 18 shown in FIG. 5, it is assumed that the input voltage $V_{VCO}$ is stable when the input voltage $V_{VCO}$ is less than or equal to the threshold voltage $V_{TH}$. But in actual practice, the input voltage $V_{VCO}$ may not necessarily be stable even when the input voltage $V_{VCO}$ is less than or equal to the threshold voltage $V_{TH}$.

Hence, a description will now be given of another embodiment of the state detector 18 which can set the prohibiting time of the bit comparison supervision part 5A with an accuracy higher than that of the state detector 18 shown in FIG. 5. FIG. 6 shows this other embodiment of the state detector 18. In FIG. 6, the state detector 18 comprises an analog-to-digital (A/D) converter 21, a clock generator 22, latch circuits 23 and 24, a comparator 25, and a discriminator 26.

The A/D converter 21 converts the input voltage $V_{VCO}$ of the VCO 15 into a digital voltage. The clock generator 22 generates a clock signal CK1 shown in FIG. 7(B) and a clock signal CK2 shown in FIG. 7(C). The latch circuit 23 latches the output digital voltage of the A/D converter 21 in response to the clock signal CK1, and the latch circuit 24 latches the output digital voltage of the A/D converter 21 in response to the clock signal CK2. Hence, when the high-speed group signal supplied to the demultiplexer circuit 11 of the auxiliary demultiplexer 4 is switched by the local scanning and the PLL circuit 16 enters the free-running state from the locked state, the input voltage $V_{VCO}$ of the VCO 15 rapidly changes as shown in FIG. 7(A). Thus, the latch circuit 23 outputs a staircase voltage V1 shown in FIG. 7(D) and the latch circuit 24 outputs a staircase voltage V2 shown in FIG. 7(E).

The comparator 25 compares the staircase voltages V1 and V2 which are received from the respective latch circuits 23 and 24, and outputs a difference voltage DV shown in FIG. 7(F). This difference voltage DV which is dependent on the difference between the staircase voltages V1 and V2 is supplied to the discriminator 26. The discriminator 26 compares the difference voltage DV and a threshold voltage Th shown in FIG. 7(F) and outputs the control signal CNT shown in FIG. 7(G) in response to the rising edge of the clock signal CK1. The threshold voltage Th corresponds to a PLL control voltage difference converted into a phase time of the clock signals CK1 and CK2. This PLL control voltage difference is a voltage difference introduced in the input voltage of the VCO 15 that would not cause a shift of one or more bits by the PLL circuit 16 during a time in which the bit comparison supervision is made. The control signal CNT falls to the low level in response to the rising edge of the clock signal CK1 when the difference voltage becomes less than or equal to the threshold voltage Th. In this embodiment, the bit comparison supervision part 5A is also disabled during the high-level period of the control signal CNT and is enabled during the low-level period of the control signal CNT. Therefore, the operation of the bit comparison supervision part 5A is disabled until the change in the input voltage $V_{VCO}$ of the VCO 15 completely stabilizes.

Of course, the levels of the control signal CNT may be set differently from the above described embodiment to determine the enabling and disabling states of the bit comparison supervision part 5A. In addition, the discriminator 26 may operate in response to the falling edge of the clock signal CK1, or in response to the rising or falling edge of the clock signal CK2.

Therefore, according to the digital communication terminal equipment of the present invention, the prohibiting time of the bit comparison supervision part of the auxiliary demultiplexer is automatically set to suit the time constant of the individual PLL circuit within the auxiliary demultiplexer.

In the described embodiment, the current multiplexer 1 may receive the low-speed group signal A via a plurality of channels. In this case, the bit error detection is carried out by sequentially scanning the channels. In addition, the number of bit comparison supervision part 5A is not limited to one, and the bit comparison supervision part 5A may be provided independently for each channel. The numbers of current and auxiliary multiplexers and current and auxiliary demultiplexers are also not limited to those of the described embodiment.

Further, the present invention is not limited to these embodiments, but various variations and modifications may be made without departing from the scope of the present invention.

What is claimed is

1. A digital communication terminal equipment which is coupled between one or a plurality of low-speed group transmission paths and one or a plurality of high-speed group transmission paths, said digital communication terminal equipment comprising:

first switch means coupled to the one or plurality of low-speed group transmission paths;

second switch means coupled to the one or plurality of high-speed group transmission paths;

a reference part coupled between said first and second switch means, said reference part being coupled between a selected one of the low-speed group transmission paths and a selected one of the high-speed group transmission paths depending on states of said first and second switch means;

a supervised part coupled between said first and second switch means, said supervised part being coupled between a selected one of the low-speed group transmission paths and a selected one of the high-speed group transmission paths depending on the states of said first and second switch means; and bit comparison supervision means for detecting a bit error in a transmission signal which is transmitted between the low-speed group transmission path and the high-speed group transmission path by comparing corresponding bits of a low-speed group signal which is obtained from said reference part and a low-speed group signal which is obtained from said monitored part and for controlling the states of said first and second switch means depending on the detected bit error, said reference part having =demultiplexer circuit which demultiplexes a high-speed group signal which is received from the high-speed group transmission path via said second switch means into a low-speed group signal, a memory for storing the low-speed group signal from said demultiplexer circuit in response to a write clock signal which is multiplexed within the high-speed group signal, a phase locked loop circuit which includes a voltage controlled oscillator and controls a read out from said memory in response to a read clock signal which is derived by smoothing the write clock signal, and a state detector for detecting an irregular change in an input voltage of the voltage controlled oscillator and for outputting a control signal, said control signal having a level for disabling an operation of said bit comparison supervision means when said state detector detects the irregular change in the input voltage of the voltage controlled oscillator.

2. The digital communication terminal equipment as claimed in claim 1 wherein said reference part comprises an auxiliary demultiplexer which is coupled between said first and second switch means, and said supervised part comprises a current multiplexer, a current demultiplexer and an auxiliary multiplexer which are respectively coupled between said first and second switch means.

3. The digital communication terminal equipment as claimed in claim 1 wherein said one or plurality of low-speed group transmission paths respectively have n channels.

4. The digital communication terminal equipment as claimed in claim 1 wherein said bit comparison supervision means comprises a phase synchronizing means for synchronizing phases of an input signal of said supervised part and an output signal of said supervised part derived via said reference part, bit error detector means for detecting the bit error based on synchronized outputs of said phase synchronizing means and for outputting a detection signal, and control means for outputting the control signal based on the detection signal from said bit error detector means unless said control means is disabled, said control means being disabled by said control signal when said state detector detects the irregular change in the input voltage of the voltage controlled oscillator.

5. The digital communication terminal equipment as claimed in claim 1 wherein said bit comparison supervision means comprises test pattern generator means for generating a test pattern signal, selector means supplied with the test pattern signal, an input signal of said supervised part and an output signal of said supervised part derived via said reference part, a phase synchronizing means for synchronizing phases of two selected signals which are selectively output from said selector means, bit error detector means for detecting the bit error based on synchronized outputs of said phase synchronizing means and for outputting a detection signal, and control means for outputting the control signal based on the detection signal from said bit error detector means unless said control means is disabled, said control means being disabled by said control signal when said state detector detects the irregular change in the input voltage of the voltage controlled oscillator, said control means controlling said selector means so that said two selected signals are the input signal of said supervised part and the output signal of said supervised part derived via said reference part or the input signal of said supervised part and the test pattern signal.

6. The digital communication terminal equipment as claimed in claim 1 wherein said state detector comprises a comparator for comparing the input voltage of the voltage controlled oscillator and a predetermined threshold voltage and for detecting the irregular change in the input voltage of the voltage controlled oscillator when the input voltage of the voltage controlled oscillator is less than or equal to the predetermined threshold voltage.

7. The digital communication terminal equipment as claimed in claim 1 wherein said state detector comprises a clock generator for generating first and second clock signals, a converter for converting the input voltage of the voltage controlled oscillator into a digital voltage, a first latch circuit for latching the digital voltage in response to the first clock signal, a second latch circuit for latching the digital voltage in response to the second clock signal, a comparator for comparing outputs of said first and second latch circuits, and a discriminator for deriving the control signal from an output of said comparator.

8. The digital communication terminal equipment as claimed in claim 7 wherein said discriminator outputs the control signal which has the level for disabling the operation of said bit comparison supervision means when the output signal level of said comparator is less than or equal to a predetermined threshold level.

9. The digital communication terminal equipment as claimed in claim 8 wherein said discriminator determines the level of the control signal for disabling the operation of said bit comparison supervision means in response to an edge of one of said first and second clock signals.

* * * * *